United States Patent
Hall (10) Patent No.: US 7,839,816 B2
(45) Date of Patent: Nov. 23, 2010

(54) ASSEMBLY, AND ASSOCIATED METHODOLOGY, FOR PROVISIONING COMPUTER DEVICE WITH OPERATING SOFTWARE

(75) Inventor: Eric P. Hall, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 915 days.

(21) Appl. No.: 11/423,592

(22) Filed: Jun. 12, 2006

(65) Prior Publication Data

US 2007/0288590 A1 Dec. 13, 2007

(51) Int. Cl.
*H04W 4/00* (2009.01)
(52) U.S. Cl. ............... 370/328; 455/422.1; 455/425; 700/113; 700/112
(58) Field of Classification Search ........... 455/418, 455/419, 420, 423–425, 41.2; 700/112, 113
See application file for complete search history.

(56) References Cited

U.S. PATENT DOCUMENTS

| | | | |
|---|---|---|---|
| 5,613,217 A | 3/1997 | Hagstrom et al. | |
| 5,640,002 A | 6/1997 | Ruppert et al. | |
| 5,768,268 A | 6/1998 | Kline et al. | |
| 5,790,952 A | 8/1998 | Seazholtz et al. | |
| 5,909,429 A * | 6/1999 | Satyanarayana et al. | 370/254 |
| 6,046,698 A * | 4/2000 | Pandey | 342/360 |
| 6,052,145 A | 4/2000 | Macrae et al. | |
| 6,097,707 A | 8/2000 | Hodzic et al. | |
| 6,487,403 B2 | 11/2002 | Carroll | |
| 6,493,217 B1 | 12/2002 | Jenkins, Jr. | |
| 6,587,684 B1 * | 7/2003 | Hsu et al. | 455/419 |
| 6,694,206 B2 * | 2/2004 | O'Connor et al. | 700/117 |
| 6,856,844 B1 | 2/2005 | McKenzie | |
| 7,027,412 B2 | 4/2006 | Miyamoto et al. | |
| 7,065,740 B2 | 6/2006 | Westerinen et al. | |
| 7,075,414 B2 | 7/2006 | Giannini et al. | |
| 7,424,610 B2 | 9/2008 | Ranganathan | |
| 7,433,936 B2 | 10/2008 | Zhu et al. | |
| 7,480,907 B1 | 1/2009 | Marolia et al. | |
| 2001/0041591 A1 | 11/2001 | Carroll | |
| 2002/0049056 A1 | 4/2002 | Sivakumar | |
| 2002/0065045 A1 | 5/2002 | Kim | |

(Continued)

FOREIGN PATENT DOCUMENTS

EP  1372299 A1  12/2003

(Continued)

OTHER PUBLICATIONS

E. Hall, Appeal Brief filed Aug. 10, 2010, U.S. Appl. No. 11/423,558, filed Jun. 12, 2006.

(Continued)

*Primary Examiner*—Nick Corsaro
*Assistant Examiner*—Vladimir Magloire (57) ABSTRACT

An assembly, and an associated methodology, for provisioning a computer server, or other device, with an operating system or other computer data. The computer server is positioned at a build area that includes wireless local area network apparatus that broadcasts provisioning software. A mobile start cart is positioned at the build area to receive the broadcast data and to provide the data to the computer server to be provisioned. Provisioning of the computer server is made without need of an Ethernet connection, or associated Ethernet infrastructure.

19 Claims, 4 Drawing Sheets

U.S. PATENT DOCUMENTS

| | | | |
|---|---|---|---|
| 2002/0155836 A1 | 10/2002 | Owens et al. | |
| 2002/0174254 A1 | 11/2002 | Kita et al. | |
| 2003/0032409 A1 | 2/2003 | Hutcheson et al. | |
| 2003/0041131 A1 | 2/2003 | Westerinen et al. | |
| 2003/0051075 A1 | 3/2003 | Purpura | |
| 2003/0114106 A1 | 6/2003 | Miyatsu et al. | |
| 2004/0006688 A1 | 1/2004 | Pike et al. | |
| 2005/0025160 A1 | 2/2005 | Meier et al. | |
| 2005/0138423 A1 | 6/2005 | Ranganathan | |
| 2005/0198629 A1 | 9/2005 | Vishwanath | |
| 2006/0026316 A1 | 2/2006 | Milenkovic et al. | |
| 2006/0080404 A1 | 4/2006 | Haber-Land Schlosser et al. | |
| 2006/0091196 A1 | 5/2006 | Durham et al. | |
| 2006/0114842 A1 | 6/2006 | Miyamoto et al. | |
| 2006/0168647 A1 | 7/2006 | Chiloyan | |
| 2006/0229027 A1 | 10/2006 | Wang et al. | |
| 2006/0253548 A1 | 11/2006 | Vitanov et al. | |
| 2006/0253693 A1* | 11/2006 | Kanodia | 713/1 |
| 2006/0256108 A1* | 11/2006 | Scaralata | 345/418 |
| 2007/0140242 A1 | 6/2007 | DiGiorgio et al. | |
| 2007/0249323 A1 | 10/2007 | Lee et al. | |
| 2007/0288590 A1* | 12/2007 | Hall | 709/217 |
| 2007/0288612 A1 | 12/2007 | Hall | |

FOREIGN PATENT DOCUMENTS

WO   WO03007162 A1   1/2003

OTHER PUBLICATIONS

E. Hall, Advisory Action Aug. 5, 2010, U.S. Appl. No. 11/423,558, filed Jun. 12, 2006.
E. Hall, Amendment after Notice of Appeal but before Appeal Brief filed Jul. 21, 2010, U.S. Appl. No. 11/423,558, filed Jun. 12, 2006.
E. Hall, Final Office Action dated Apr. 16, 2010, U.S. Appl. No. 11/423,558, filed Jun. 12, 2006.
E. Hall, Response to Office Action dated Oct. 20, 2009, U.S. Appl. No. 11/423,558, filed Jun. 12, 2006.
E. Hall, Office Action dated Oct. 20, 2009, U.S. Appl. No. 11/423,558, filed Jun. 12, 2006.
E. Hall, RCE & Response to Final Office Action dated May 29, 2009, U.S. Appl. No. 11/423,558, filed Jun. 12, 2006.
E. Hall, Final Office Action dated May 29, 2009, U.S. Appl. No. 11/423,558, filed Jun. 12, 2006.
E. Hall, Response to Office Action dated Nov. 10, 2008, U.S. Appl. No. 11/423,558, filed Jun. 12, 2006.
E. Hall, Office Action dated Nov. 10, 2008, U.S. Appl. No. 11/423,558, filed Jun. 12, 2006.

* cited by examiner

ASSEMBLY, AND ASSOCIATED METHODOLOGY, FOR PROVISIONING COMPUTER DEVICE WITH OPERATING SOFTWARE

The present invention relates generally to a manner by which to provision a computer server, or other device, with operating software, or other computer data. More particularly, the present invention relates to apparatus, and an associated method, by which to provision the computer device with computer data at a secure location, without the need to provide an Ethernet, or other high-speed, wired connection between the computer device and a source location that sources the computer data. Provisioning of the computer device is carried out using a radio connection with a radio network and a portable wireless bridge releasably connectable to the computer device.

A build area need not have an Ethernet infrastructure installed in order to permit provisioning of the computer device. Instead, a more-easily constructed, and less expensive wireless provisioning network is used to provision the computer device.

BACKGROUND OF THE INVENTION

Advancements in communication technologies have permitted the development and deployment of new types of communication systems and services. Development and deployment of public data networks that form the Internet, for instance, have provided, in recent years, a publicly-accessible, communication network of global scope.

While a wide range of communication services are able to be carried out by way of the Internet, perhaps the most widely performed communication services carried out by way of the Internet are that of retrieval services.

In a typical data retrieval service, data is requested by a first communication device connected to the data network. And, the requested data, stored at a second device connected to the network is retrieved therefrom and provided to the requesting device or its proxy. Computer servers are amongst the communication devices at which large amounts of data is regularly stored and whose data is accessed and provided to a requesting device in a typical content-retrieval, communication service.

Data retrieval services are also provided in private networks. A private network is created, for instance, for a business, governmental, or other entity in which access to the network is limited, viz., not accessible by the general public. In such private networks, also, computer servers are typically utilized at which to store large amounts of data. The computer server is connected to the private network. Other communication devices, also connected to the private network, retrieve, or otherwise are provided with, data sourced at the computer server.

A computer server typically is not in a production-ready state upon its manufacture. That is to say, the hardware of the computer server, once manufactured and assembled, must be provisioned with an operating system and other software. The operating system is installed with software packages and specified patches.

While various mechanisms are available by which to facilitate the provisioning of a computer server, such mechanisms generally rely upon the availability of an Ethernet connection by which to connect the computer server to a source of the software that is to be provided to the server to provision the server with the operating system and other software. An exemplary such mechanism, an OPSWARE™ server automation system (SAS) facilitates automatic management of WINDOWS™, LINUX™, and UNIX™ server and application software. OPSWARE™ includes the capability of operating system provisioning (OSP). Operation of OPSWARE™ permits an assembled computer server in a "bare metal" state to be provisioned into a "production-ready" state through the installation of an appropriate operating system with specified patches and software packages. SOLARIS™-based, LINUX™-based, and WINDOWS™-based computer servers are all exemplary of computer-server types that are able to be provisioned through operation of the OPSWARE™ operating system provisioning.

The conventional reliance upon the Ethernet connection, however, limits the locations available at which to provision the computer server. Security constraints also sometimes limit the location at which a computer server is permitted to be provisioned. That is to say, security requirements sometimes prohibit a computer server from being connected to a production network, private or public, until the computer server has been built out to an acceptable security level, typically requiring the computer server to have a completed, base operating system installed, as well as installation of associated service packs and security patches and, e.g., third-party, security products, such as anti-virus software.

In one conventional manner by which to provision a computer server, the computer server is delivered to a physically-isolated build area that contains a wired, Ethernet infrastructure. The computer server is provisioned and then transported to a production location. The computer server, however, requires multiple transport actions, that is to say, transport to the isolated build area and subsequent transport to the production location.

Alternately, if the production location at which the computer server is permanently to be positioned contains structure of a wired build network, i.e., forms an isolated build area having a wired-Ethernet infrastructure, the multiple transport of the computer server to provision the server with the operating software is obviated. However, costs associated with the installation of a separate, wired build network are sometimes prohibitively expensive and, oftentimes, is not a practical solution.

What is needed, is an improved manner by which to provide for the provisioning of a computer server, or other computer device.

It is in light of this background information that the significant improvements of the present invention have evolved.

SUMMARY OF THE INVENTION

The present invention, accordingly, advantageously provides apparatus, and an associated method, by which to provision a computer server, or other device, with operating software, or other data.

Through operation of an embodiment of the present invention, a manner is provided by which to provision the computer device with computer data at a secure location, without the need to provide an Ethernet, or other high-speed, wired connection between the computer device and a source location at which the computer data is sourced.

In one aspect of the present invention, provisioning of the computer device is carried out using a radio connection with a radio network and a portable work bridge work group releasably connectable to the computer device.

Through use of the radio connection, a computer server, or other computer device, need not be provisioned at a build area that provides an Ethernet infrastructure and then moved to a production, or other actual-use, location.

In another aspect of the present invention, a build area is provided with a radio transceiver, such as an 802.11, access point. The radio transceiver broadcasts data forming the operating system software, or other computer data, in a manner permitting reception of the broadcast data by corresponding receiver circuitry that is connectable to the computer server that is to be provisioned. The radio receiver that receives the broadcast of the data forms, for instance, a wireless LAN (local area network) bridge, such as a wireless bridge work group.

In another aspect of the present invention, the receiver circuitry that receives the broadcast of the data is supported at a mobile support platform or device. The mobile support platform forms, for instance, a wheeled platform that permits wheeled positioning of the radio receiver circuitry in position to receive the data broadcast by the build area transceiver. The mobile support device is transportable to successive build areas to facilitate provisioning of successive computer servers.

In another aspect of the present invention, the wireless bridge work group 802.11 provides for wired connection to the computer server that is to be provisioned. Data detected by the receiver circuitry is routed, by way of the wired connection, to the computer server, thereby to provision the computer server with the operating software.

In another aspect of the present invention, the access point or other radio transceiver is connected to a virtual local area network (VLAN) through, e.g., a multi-port switch. And, the operating system data, source code, or the like, is resident at a provisioning server that is also connected to the virtual local area network. Operating system data and other computer data sourced at the provisioning computer server is provided to the radio transceiver located in the build area by way of the virtual local area network.

In a further aspect of the present invention, data that is broadcast by the access point connected to the virtual local area network is encrypted, such as by way of an encryption key pursuant to an encryption scheme. And, the receiver circuitry that receives the broadcast data, broadcast by the access point, de-encrypts the communicated data and forwards on the data to the computer server to provision the computer server with the received data, once de-encrypted.

By using the radio connection to communicate the operating system, and other computer, data, a build area need not be constructed to include an Ethernet connection to form a wired, Ethernet connection with the computer server that is to be provisioned with the provisioning data. Instead, positioning of the wireless bridge at the build area in reception range of the broadcast data provides for communication connectivity to receive the broadcast data and to provide the computer server with the data to be provisioned therewith. Installation of the access point at a build area and its connection to a virtual local area network is generally substantially less costly than installation of an Ethernet infrastructure at the build area. Additionally, the time required to install the access point, form a connection with a local area network, and position the mobile support device and the wireless bridge in position at the build area is also much smaller than the time typically required to install and make operable the Ethernet infrastructure.

In these and other aspects, therefore, an assembly, and an associated methodology, is provided that facilitates provisioning of a computer device with provisioning data when positioned at a provisioning location. A wireless network connector is configured selectably to receive network-sourced computer data when positioned at the provisioning location. The network-sourced computer data comprises the provisioning data. A wired connector is releasably connectable to the computer device and to the wireless network connector. When connected, the network-sourced computer data forming the provisioning data is received by the wireless network connector is provided to the computer device. A mobile support platform is configured to support the wireless network connector and the wired connector connectable thereto. The mobile support platform is positionable at the provisioning location to provision the wireless network connector to permit reception of the network-sourced computer data.

In these and other aspects, further assembly, and associated methodology, is provided for facilitating computer-device provisioning of provisioning data at a provisioning location. An access point is positioned at the provisioning location. The access point is configured to broadcast network-sourced computer data that forms the provisioning data. A virtual local area network element is connected to the first access point. The network-sourced computer data is provided to the access point for broadcast therefrom by the virtual area network element. A computer data source is connected in communication connectivity with the virtual local area network element. The computer data source is configured to source the network-sourced computer data broadcast by the access point.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
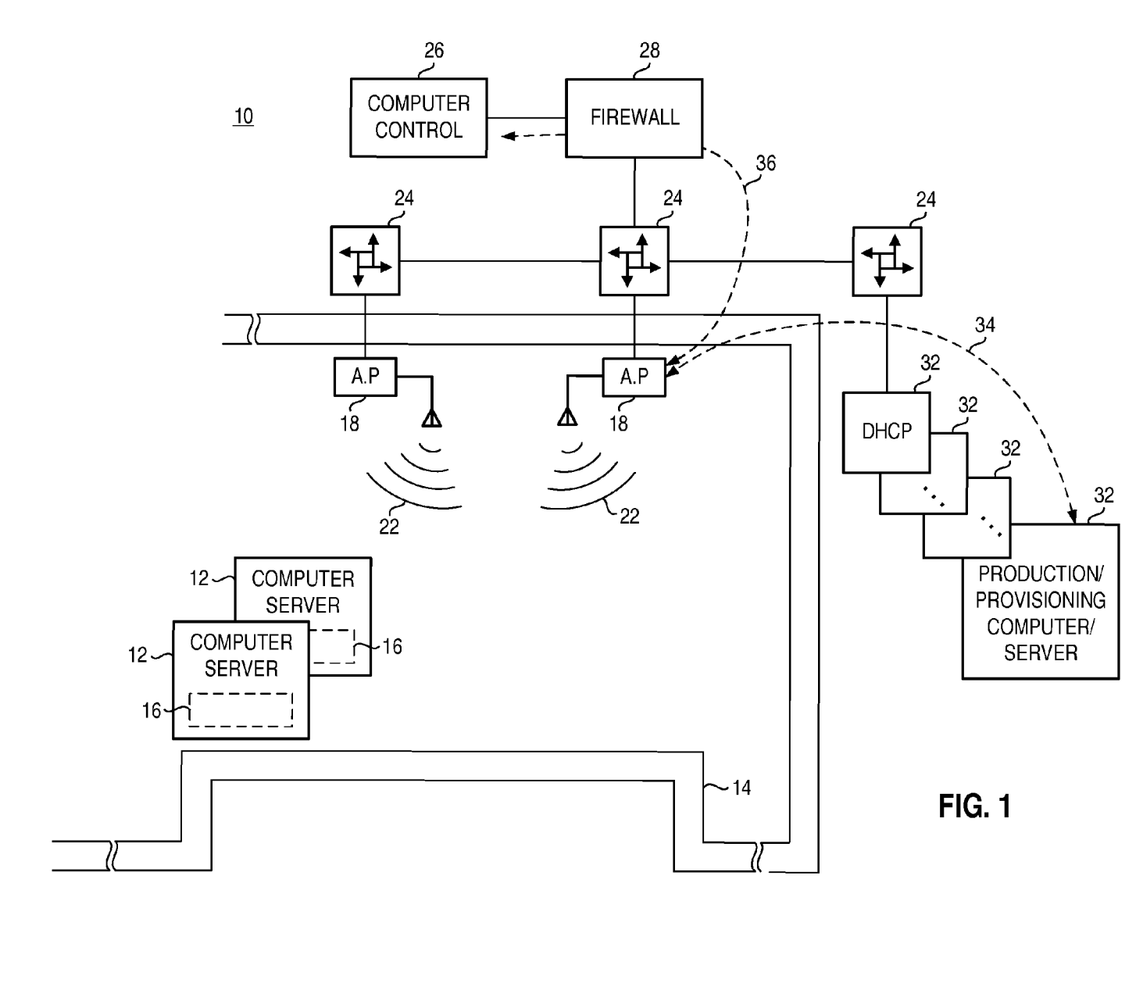
FIG. 1 illustrates a partial functional block, partial schematic representation of a build area configured pursuant to an embodiment of the present invention.

Referring first to FIG. 1, therefore, a build area, shown generally at 10, provides a secure area at which to provision a computer server. Here, a set of computer servers that are positioned at a raised floor area 14 of the build area. The computer servers, in the exemplary implementation, are representative of WINDOWS™-based, LINUX™-based, or UNIX™-based servers that are to be provisioned with their operating systems with specified patches and software packages. Boxes 16 at the computer servers 12 represent the storage locations at which the provisioned software and other computer data is stored. And, once the computer servers are provisioned with the software and computer data, the boxes 16 are further representative of the software and computer data provisioned thereto. More generally, the computer servers 12 are representative of any computer device to which computer data is to be provisioned. While the following description shall be described with respect to the exemplary implementation in which computer servers are to be provisioned with operating system software, the following description is also representative of the provisioning of any computer device with any type of computer data.

One or more access points 18 are positioned at the build area. Here, two ceiling-mounted, access points are positioned at the build area. In other implementations, other numbers of access points, and positioning of the access points at other locations of the build area are provided. The access points are operable in conformity with 802.11(g) operating protocols. The access points are provided with data forming the operating system software or other computer data that is to be used to provision the computer servers 12. Designations 22 are representative of signals broadcast by the access terminals.

The access terminals are connected, here by way of ports 24. The ports are part of an isolated virtual local area network (VLAN) that, in the exemplary implementation, is dedicated to OPSWARE™ operating system provisioning (OSP). The VLAN is located, e.g., on switches that are maintained and monitored as part of a maintenance center at which the build area is located. And, monitoring and control over the VLAN is provided as part of the maintenance center network infrastructure. Here, monitoring of the VLAN is performed by way of a maintenance-center computer 26 positioned behind a firewall 28.

Production servers 32 are also connected to the virtual local area network, here also by way of a port 24. The production servers source the operating software that is provided, by way of the VLAN to the access points 18 to be broadcast therefrom. Here, three multi-honed production servers are pictured, and a fourth server forms a DHCP server that operates, e.g., to push server updates. In one implementation, the production database is maintained on a separate subnetwork.

Segments 34 represent routing paths by which operating software is routed between a server 32 and an access point 18. And, the segment 36 is representative of maintenance and control over operation of the access point 18 by the computer 26.

FIG. 2 again illustrates the build area 10 and the VLAN infrastructure installed thereat. Here, additionally, a mobile start cart 42 of an embodiment of the present invention is shown. The mobile start cart includes wireless bridges 46 that are capable of detecting data, here represented by the arrows 22, broadcast by the access points 18. The wireless bridges comprise wireless bridge work groups 802.11(g) devices that transceive 802.11(g)-formatted data and also provides for wired connection, here by way of wirelines 48 that extend to network interface cards (NICs) of the computer servers 12.

Figure 2:
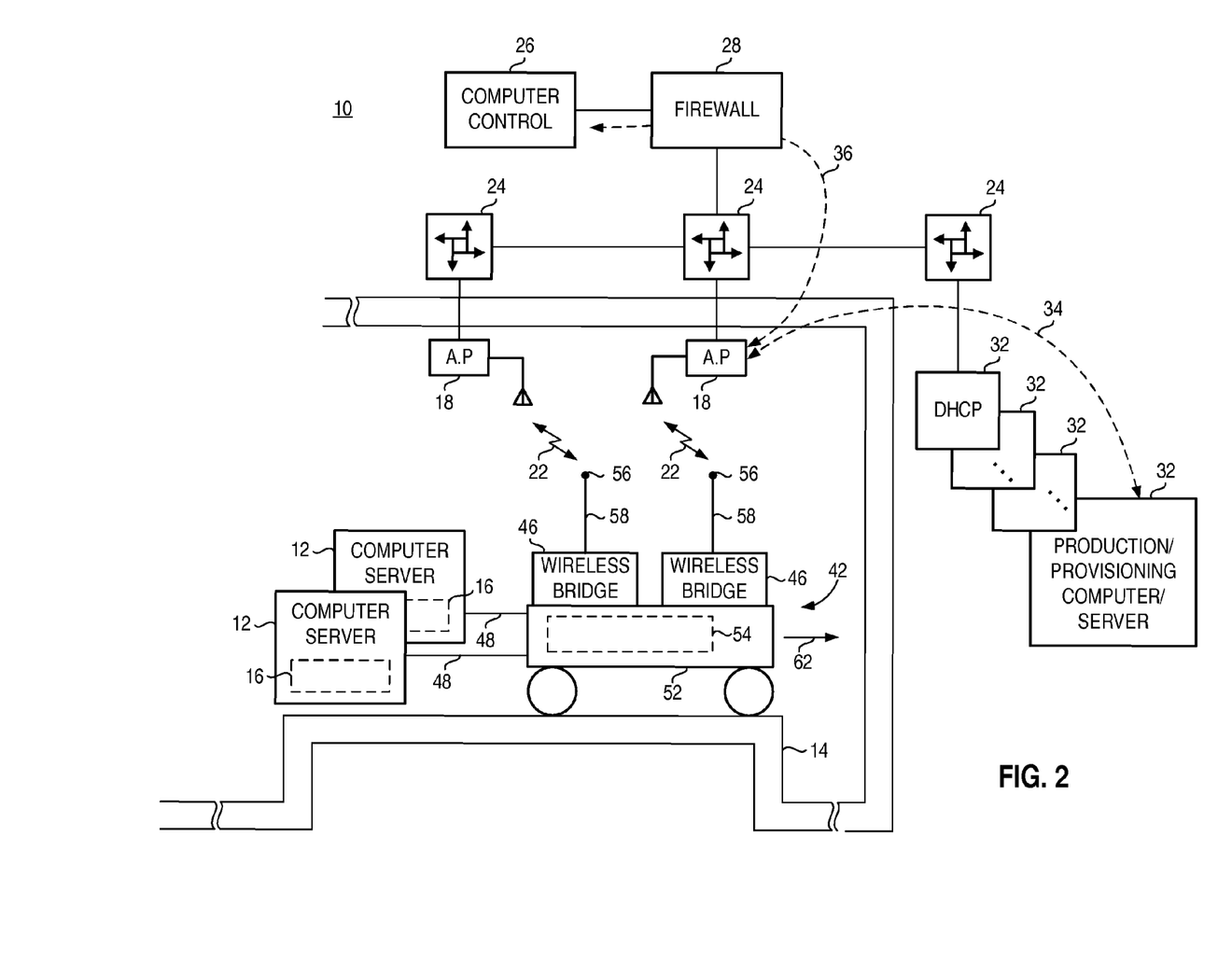
FIG. 2 illustrates a representation, similar to that shown in FIG. 1, but herein which a mobile start cart of an embodiment of the present invention positioned at the build area.

The mobile cart 42 supports the bridges 46 upon a wheeled platform 52 that is wheeled into position at the raised floor 14 within reception range of the access points 18. And, the wired connection of the wireline 48 is made with the NIC (network interface card) of the servers 12. In the exemplary implementation, a set of two wireless bridges 46 are supported upon the support platform 52 of the mobile start cart. And, here, wirelines 48 extend between the mobile start cart and each of the servers 12. In the exemplary implementation, the devices 46 are formed of Cisco AIR-BR1310-A-K9-R and AIR-BR1310-A-K9 devices configured into work group bridge mode. The mobile start cart further includes a pair of linksys5-port switches 54 as well as other elements to provide for the routing of the operating system data broadcast by the access points onto the computer servers.

In the exemplary illustration shown in FIG. 2, the wireless bridges 46 are configured to include antennas 56. The leftmost (as shown) wireless bridge includes a directional antenna 56 and the right-most (as shown) wireless bridge includes an omni-directional antenna 56. The antennas 56 are, e.g., pole-mounted upon poles 58 that extend upwardly beyond the support frame 52 of the mobile start cart.

Merely by wheeling, indicated by the arrow 62, the mobile start cart into position upon the raised floor and placing the wireless bridges into communication connectivity with the access points 18, and the wirelines 48 into connection with the computer servers, provisioning of the computer servers is able to commence. The build area of the maintenance center at which the computer servers are to be provisioned need not include an Ethernet infrastructure. Rather, a more-easily configurable wireless transceiver, connected to a virtual local area network, is used to provide the provisioning data to the computer servers by way of the mobile start cart.

Increased security is provided by encrypting the data broadcast by the access points. For instance, in one implementation, wireless fidelity (wi-fi) protected access (WPA1) encryption is utilized. In another implementation, WPA2/AES encryption is utilized. Such encryption utilizes 63-bit ASCII keys that generate a 256-bit encryption code. Appropriate keys are provided to the structure supported at the mobile start cart so that the encrypted data received thereat can be de-encrypted.

In one implementation, a maintenance center at which the build area is positioned includes a plurality of build areas, each of which encrypts data using separate WPA-PSK encryption keys. And, in another implementation, TKIP and MIC is utilized to strengthen the encryption and to correct flaws, if any, noticed in the WEP. And, in further implementations, additional security is provided. For instance, the 256-bit encryption key is created using a 64-character, random letter, number, and punctuation symbol sequence. Characters that are produced using a password generator are, e.g., used only one time and are not saved. And, configurations of the equipment are cleared prior to re-use, all to facilitate the security of the encryption.

Figure 3:
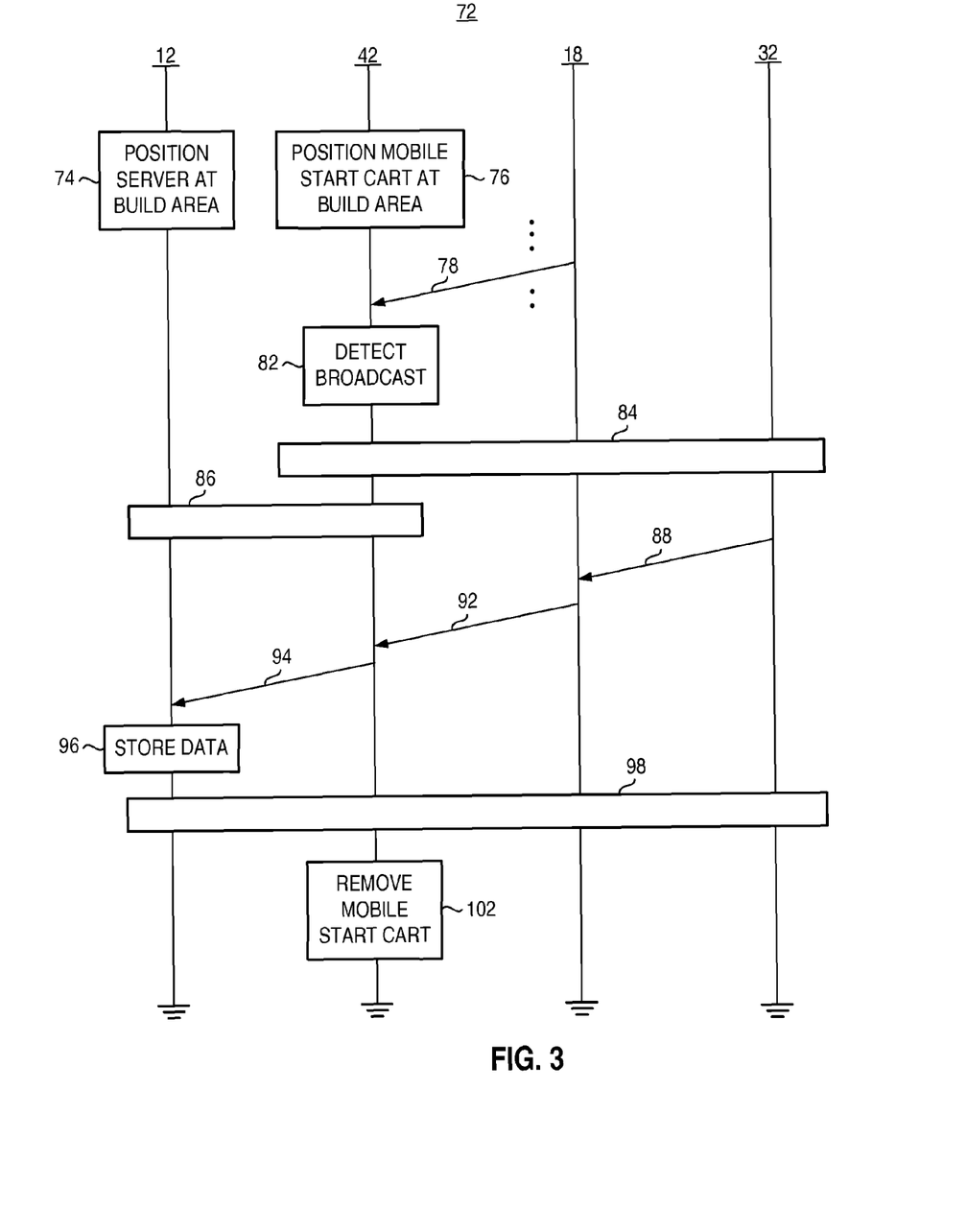
FIG. 3 illustrates a process diagram representative of exemplary operation of the build area and wireless start cart shown in FIG. 2 to provision a computer server with operating system software, or other computer data.

FIG. 3 illustrates a process diagram, shown generally at 72, representative of operation of an embodiment of the present invention, such as that implemented by the structure shown in FIG. 2, pursuant to provisioning of a computer server. The process commences subsequent to installation of the wireless infrastructure at the build area and formation of the virtual local area network.

As indicated by the blocks 74 and 76, respectively, a computer server 12 is positioned at the build area, and a mobile start cart is positioned at the build area. Signaling messages, represented by the segment 78, is broadcast by an access point 18. And, as indicated by the block 82, structure supported at the mobile start cart detects the broadcast signaling. Responsive to detection of the signaling messages, a dialog is established, indicated by the block 84, between the mobile start cart and the provisioning computer 32, by way of an access point 18, and other associated structure of the VLAN. Once established, and the mobile start cart is connected, indicated by the block 86, with the computer server, operating system software, and other computer data, sourced at the provisioning computer 32, is provided, here represented by the segments 88, 92, and 94, to the computer server. The data provided to the computer server is stored, indicated by the block 96, thereat. Upon completion of the provisioning of the computer server, the dialog is terminated, indicated by the block 98. Thereafter, and as indicated by the block 102, the mobile start cart is repositioned, if desired, elsewhere.

Figure 4:
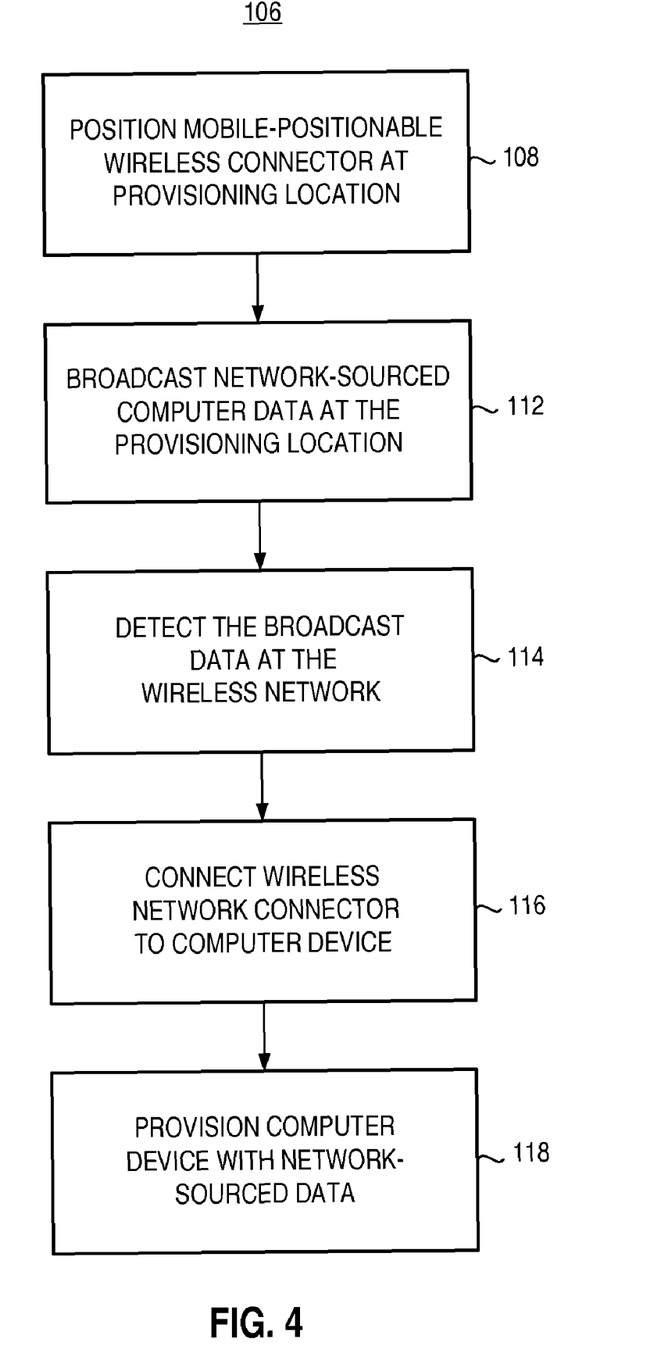
FIG. 4 illustrates a method flow diagram listing the method of operation of an embodiment of the present invention.

FIG. 4 illustrates a method flow diagram, shown generally at 106, representative of the method of operation of an embodiment of the present invention.

First, and as indicated by the block 108, a mobile-positionable wireless network connector is positioned at a provisioning location. Then, and as indicated by the block 112, network-sourced computer data is broadcast in the provisioning location. As indicated by the block 114, the mobile-positional wireless network connector detects the network-sourced computer data broadcast in the provisioning location.

The mobile-positional wireless network connector is connected, as indicated by the block 116, to a computer device. And, as indicated by the block 118, the computer device is provisioned with the network-sourced data. The network-sourced data forms provisioning data.

Thereby, free of an Ethernet connection and associated Ethernet infrastructure, a computer server is provisioned with operating software or other computer data.

The previous descriptions are of preferred examples for implementing the invention, and the scope of the invention should not necessarily be limited by this description. The scope of the present invention is defined by the following claims.

What is claimed is:

1. An assembly for facilitating provisioning of a computer device with provisioning data at a provisioning location, said assembly comprising:
   a wireless network connector configured selectably to receive network-sourced computer data, the network-sourced computer data comprising the provisioning data, when positioned at the provisioning location;
   a wired connector releasably connectable to the computer device and to said wireless network connector, such that, when connected, the network-sourced computer data forming the provisioning data received by said wireless network connector is provided to the computer device; and
   a mobile support platform configured to support said wireless network connector and the wired connector connectable thereto, said mobile support platform positionable at the provisioning location to position said wireless network connector to permit reception of the network-sourced computer data;
   wherein the computer device is positionable at the provisioning location independently from the mobile support platform;
   wherein the computer device comprises a computer server that, once provisioned with the provisioning data sourced at a network device, is connectable to a data network, wherein the provisioning data comprises an operating system, and wherein said wireless network connector and said wired connector together provide for reception, by the computer device, of the provisioning data free of a wired build network at the provisioning location; and,
   wherein the wireless network connector is configured to detect different network-originated computer data when positioned at different build areas, and provide different data for provisioning based on the different detected computer data.

2. The assembly of claim 1 wherein said wireless network connector and said wired connector together comprise a wireless local area network, LAN, workgroup bridge.

3. The assembly of claim 1 further comprising a first access point positioned at the provisioning location, said first access point placeable in communication connectivity with said wireless network connector and to provide the network sourced computer data thereto.

4. The assembly of claim 3 further comprising a virtual local area network element connected to said first access point, the network-sourced computer data provided to said wireless network connector by way of said virtual local area network element.

5. The assembly of claim 4 wherein the network-sourced computer data is sourced at a network server and wherein the network server is connected in communication connectivity with said virtual local area network element.

6. The assembly of claim 1 wherein said wireless network connector comprises an 802.11-compatible radio transceiver.

7. The assembly of claim 1 wherein the network-sourced computer data comprises encrypted data and wherein said assembly further comprises a de-encryptor configured to de-encrypt the encrypted data received at said wireless network connector.

8. The assembly of claim 1 wherein said mobile support platform comprises a wheeled-platform permitting of wheeled movement of said wireless network connector and said wired connector connectable thereto at said provisioning location.

9. The assembly of claim 1 wherein said wireless network connector further comprises an antenna configured to transducer the network-sourced computer data, the antenna constructed to exhibit a desired antenna pattern.

10. An assembly for facilitating computer-device provisioning of provisioning data at a provisioning location, said assembly comprising:
    an access point positioned at the provisioning location, said access point configured to broadcast network-sourced computer data that forms the provisioning data comprising an operating system;
    a virtual local area network element connected to said first access point, the network-sourced computer data provided to said access point for broadcast therefrom by said virtual area network element;
    a computer data source connected in communication connectivity with said virtual local area network element, said computer data source configured to source the network-sourced computer data broadcast by said access point; and
    a mobile support device configured to support receiver circuitry that receives the broadcast computer data, the mobile support device being transportable to provision successive computer-devices located in successive build areas; and
    wherein the receiver circuitry is configured to detect different network-originated computer data when positioned at the successive build areas, and provide different data for provisioning based on the different detected computer data;
    wherein said receiver circuitry provides for reception of the provisioning data free of a wired build network at the provisioning location.

11. A method for facilitating provisioning of a computer device with provisioning data at a provisioning location, said method comprising the operations of:
    positioning a mobile-positionable wireless network connector at the provisioning location;
    positioning the computer device at the provisioning location independently from a mobile support platform comprising the mobile-positionable wireless network connector;
    detecting, at the mobile-positionable wireless network connector, the network-sourced computer data broadcast in the provisioning location;
    connecting the mobile-positionable wireless network connector to the computer device;

provisioning the computer device with the network-sourced data by way of connection made during said operation of connecting, the network-sourced data forming the provisioning data;

providing an operating system to the computer device, by the wireless network connector, via the provisioning data;

configuring the computer device to include a computer server that once provisioned, by the wireless network connector, with the provisioning data sourced at a network device, is connectable to a data network;

detecting, by the wireless network connector, different network-originated computer data, based on the wireless network connector being positioned in different build areas; and providing, by the wireless network connector, different data for provisioning in the different build areas based on the different network-originated computer data;

wherein said wireless network connector provides for reception, by the computer device, of the provisioning data free of a wired build network at the provisioning location.

12. The method of claim 11 further comprising the operation of supporting the wireless network connector upon a mobile support platform and wherein said operation of positioning comprises positioning the mobile support platform and the wireless network connector supported thereon at the provisioning location.

13. The method of claim 12 wherein said mobile support platform comprises a wheeled platform and wherein said operation of positioning comprises wheeling the wheeled platform into position at the provisioning location.

14. The method of claim 11 wherein the mobile-positionable wireless network connector positioned during said operation of positioning comprises a wireless bridge workgroup element.

15. The method of claim 11 further comprising the operation of broadcasting the network-sourced computer data in the provisioning location.

16. The method of claim 15 further comprising the operation of mounting an access point at the provisioning location and wherein said operation of broadcasting comprises broadcasting the network-sourced data from the access point.

17. The method of claim 16 further comprising the operation of connecting the access point to a virtual local area network and wherein the network-sourced data broadcast by said access point is provided thereto by way of the virtual local area network.

18. The method of claim 17 further comprising the operations of connecting a network data source to the virtual local area network and of sourcing the network-sourced data from the network data source.

19. The method of claim 11 wherein the provisioning location comprises a secured enclosure area at which the computer device is positioned and wherein said operation of positioning comprises positioning the mobile-positionable wireless network connector in the secured enclosure area.

* * * * *

UNITED STATES PATENT AND TRADEMARK OFFICE
CERTIFICATE OF CORRECTION

| | | |
|---|---|---|
| PATENT NO. | : 7,839,816 B2 | Page 1 of 1 |
| APPLICATION NO. | : 11/423592 | |
| DATED | : November 23, 2010 | |
| INVENTOR(S) | : Eric P. Hall | |

It is certified that error appears in the above-identified patent and that said Letters Patent is hereby corrected as shown below:

In column 8, lines 21-22, in Claim 9, delete "transducer" and insert -- transduce --, therefor.

In column 8, line 29, in Claim 10, after "forms" delete "the".

Signed and Sealed this
Twenty-ninth Day of March, 2011

David J. Kappos
*Director of the United States Patent and Trademark Office*